(12) United States Patent
Nagao

(10) Patent No.: US 10,493,580 B2
(45) Date of Patent: Dec. 3, 2019

(54) TELESCOPIC COVER AND MACHINE TOOL

(71) Applicant: FANUC CORPORATION, Yamanashi (JP)

(72) Inventor: Akihiko Nagao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 11 days.

(21) Appl. No.: 16/029,948

(22) Filed: Jul. 9, 2018

(65) Prior Publication Data

US 2019/0015943 A1    Jan. 17, 2019

(30) Foreign Application Priority Data

Jul. 14, 2017    (JP) .................. 2017-137892

(51) Int. Cl.
B23Q 11/08    (2006.01)

(52) U.S. Cl.
CPC ... B23Q 11/0825 (2013.01); *Y10T 409/30392* (2015.01); *Y10T 409/304088* (2015.01)

(58) Field of Classification Search
CPC .......................................................... B23Q 11/08; B23Q 11/0825; B23Q 11/0866; B23Q 11/0875; B23Q 11/0883;
(Continued)

(56) References Cited

U.S. PATENT DOCUMENTS 4,722,452 A * 2/1988 Hennig .............. B23Q 11/0825
206/408

4,771,906 A * 9/1988 Hennig .............. B23Q 11/0825
220/8

(Continued)

FOREIGN PATENT DOCUMENTS

EP    1728588 A1    12/2006
JP    S9-9264 Y    7/1934
(Continued)

OTHER PUBLICATIONS

An Office Action; "Notification of Reasons for Refusal," issued by the Japanese Patent Office dated Jan. 22, 2019, which corresponds to Japanese Patent Application No. 2017-137892 and is related to U.S. Appl. No. 16/029,948; with English Translation.

(Continued)

*Primary Examiner* — Alan Snyder
*Assistant Examiner* — Yasir A Diab
(74) *Attorney, Agent, or Firm* — Studebaker & Brackett PC

(57) ABSTRACT

To provide a telescopic cover having a structure in which a stopper is easy to be exchanged, and a machine tool. A telescopic cover of a machine tool is formed to be freely expandable and contractible in a predetermined direction. A first cover piece and a second cover piece have a pair of receiving side stoppers that project outward in both ends of side surfaces along a predetermined direction, and slits formed along the predetermined direction in between the pair of receiving side stoppers, as receiving side cover pieces. The second cover piece and the third cover piece have nesting side stoppers that are inserted into the slits by projecting outward in the side surfaces along the predetermined direction, and move between the pair of receiving side stoppers as nesting side cover pieces.

4 Claims, 2 Drawing Sheets

(58) Field of Classification Search
CPC ........ B23Q 11/0891; B23Q 2011/0808; Y10T 409/30392; Y10T 409/304088
USPC .......... 451/451, 455, 457; 74/608, 612, 613, 74/615, 616; 160/116, 180, 185, 202, 160/220–224
See application file for complete search history.

(56) References Cited

U.S. PATENT DOCUMENTS

| | | | | |
|---|---|---|---|---|
| 5,169,223 A * | 12/1992 | Suzuki | ............... | B23Q 11/0825 160/202 |
| 5,178,499 A * | 1/1993 | Umeda | ............... | B23Q 11/0825 29/DIG. 56 |
| 5,482,414 A * | 1/1996 | Hayashi | ............... | B23Q 11/0825 409/134 |
| 5,807,043 A * | 9/1998 | Blank | ............... | B23Q 1/017 160/202 |
| 5,915,897 A * | 6/1999 | Reynolds | ............... | B23Q 11/0825 160/202 |
| 6,052,859 A * | 4/2000 | Diels | ............... | B23Q 11/0875 15/246 |
| 6,431,249 B1 * | 8/2002 | Tabellini | ............... | B23Q 11/0825 160/202 |
| 6,481,313 B1 * | 11/2002 | Tabellini | ............... | B23Q 11/0825 162/202 |
| 7,412,759 B1 * | 8/2008 | Hsieh | ............... | B23Q 11/0825 160/202 |
| 9,366,385 B2 * | 6/2016 | Ishihara | ............... | F16P 3/02 |
| 2002/0172570 A1 * | 11/2002 | Tsurumaki | ............... | B23Q 11/0825 409/134 |
| 2003/0121362 A1 * | 7/2003 | Goellner | ............... | B23Q 11/0816 74/608 |
| 2005/0045638 A1 * | 3/2005 | Maki | ............... | B23Q 11/0825 220/279 |
| 2005/0082118 A1 * | 4/2005 | Funakoshi | ............... | B23Q 1/28 182/170 |
| 2006/0225848 A1 * | 10/2006 | O'Rourke | ............... | B23Q 11/0825 160/223 |
| 2008/0110376 A1 * | 5/2008 | Hsieh | ............... | B23Q 11/0825 108/20 |
| 2011/0017410 A1 * | 1/2011 | Yamashita | ............... | B23Q 11/0825 160/222 |
| 2015/0053357 A1 * | 2/2015 | Reus | ............... | E04H 4/082 160/201 |

FOREIGN PATENT DOCUMENTS

| | | |
|---|---|---|
| JP | H7-60593 A | 3/1995 |
| JP | 2002-346878 A | 12/2002 |
| JP | 2005-138274 A | 6/2005 |
| JP | 2007-296591 A | 11/2007 |
| JP | 2011-025324 A | 2/2011 |
| JP | 2015-205391 A | 11/2015 |

OTHER PUBLICATIONS

Office Action issued in JP 2017-137892; mailed by the Japanese Patent Office dated May 14, 2019.

* cited by examiner

TELESCOPIC COVER AND MACHINE TOOL

This application is based on and claims the benefit of priority from Japanese Patent Application No. 2017-137892, filed on 14 Jul. 2017, the content of which is incorporated herein by reference.

BACKGROUND OF THE INVENTION

Field of the Invention

The present invention relates to a telescopic cover formed to be freely expandable and contractible, and a machine tool including the telescopic cover.

Related Art

In conventional machine tools, a cover generally called a telescopic cover that expands and contracts at the time of axis movement is used, since a drive unit needs to be protected from chips and cutting fluid, and in order to suppress a size of the machine tool. This telescopic cover is formed by sequentially overlapping a plurality of tube-shaped cover pieces having different sizes in a nesting structure with each other so that the entire telescopic cover is freely expandable and contractible in a direction of the nesting structure.

For example, telescopic covers having a structure of controlling expansion and contraction by using a stopper such as a cushion rubber are disclosed (for example, see Patent Documents 1 and 2). In these telescopic covers, shock generated in between adjacent cover pieces at the time of expansion or contraction of the cover is mitigated by the stopper such as a cushion rubber.

Patent Document 1: Japanese Unexamined Patent Application, Publication No. 2002-346878

Patent Document 2: Japanese Unexamined Patent Application, Publication No. 2015-205391

SUMMARY OF THE INVENTION

A stopper such as a cushion rubber needs to be regularly exchanged, due to time degradation. However, in telescopic covers disclosed in Patent Documents 1 and 2, since the stopper such as a cushion rubber is disposed inside a cover, there is a problem that the stopper is hard to be exchanged, for example, since a task of detaching a cover piece is involved in exchanging.

The present invention has been made in consideration of the problem described above, and an object of the present invention is to provide a telescopic cover having a structure in which a stopper is easy to be exchanged, and a machine tool.

(1) A telescopic cover (for example, a telescopic cover 2 described later) according to the present invention is a telescopic cover formed to be freely expandable and contractible in a predetermined direction (for example, a predetermined direction X described later) by overlapping a plurality of tube-shaped cover pieces (for example, a first cover piece 10, a second cover piece 20, and a third cover piece 30 described later) having different sizes in a nesting structure with each other, in which the plurality of cover pieces respectively function as one or both of receiving side cover pieces (for example, a first cover piece 10 and a second cover piece 20 described later) and nesting side cover pieces (for example, a second cover piece 20 and a third cover piece 30 described later) that are inserted into the receiving side cover pieces, the receiving side cover pieces have a pair of receiving side stoppers (for example, receiving side stoppers 111, 112, 211, 212 described later) that project outward in both ends of a surface along the predetermined direction, and slits (for example, slits 113, 213 described later) formed along the predetermined direction in between the pair of receiving side stoppers, and the nesting side cover pieces have nesting side stoppers (for example, nesting side stoppers 214, 314) that are inserted into the slits by projecting outward in the surface along the predetermined direction, and move between the pair of receiving side stoppers.

(2) In the telescopic cover of (1), the nesting side stoppers may have a jutted shape in an orthogonal direction to the slits in outsides of the receiving side cover pieces.

(3) In the telescopic cover of (1) or (2), the receiving side stoppers of the cover pieces that function as both of the receiving side cover and the nesting side cover may have a projection height (for example, a projection height h described later) from the cover pieces that is lower than a distance (for example, a distance d described later) of a clearance formed between outer surfaces of the cover pieces and inner surfaces of the nesting side cover pieces into which the cover pieces are inserted.

(4) A machine tool (for example, a machine tool 1 described later) according to the present invention includes the telescopic cover according to any of (1) to (3).

According to the present invention, a telescopic cover having a structure in which a stopper is easy to be exchanged, and a machine tool can be provided.

DETAILED DESCRIPTION OF THE INVENTION

Figure 1A:
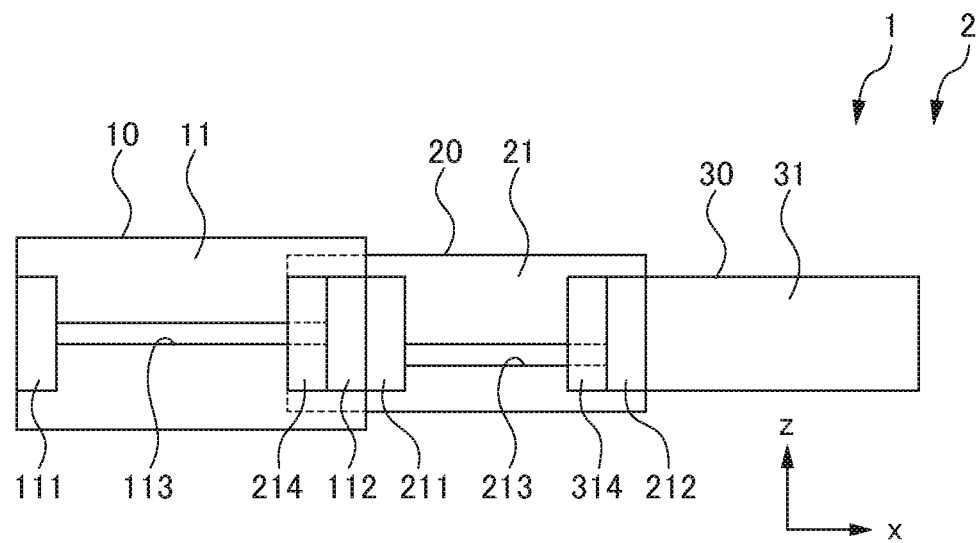
FIG. 1A is a side view showing a state in which a telescopic cover of a machine tool according to an embodiment of the present invention is expanded.
Figure 1B:
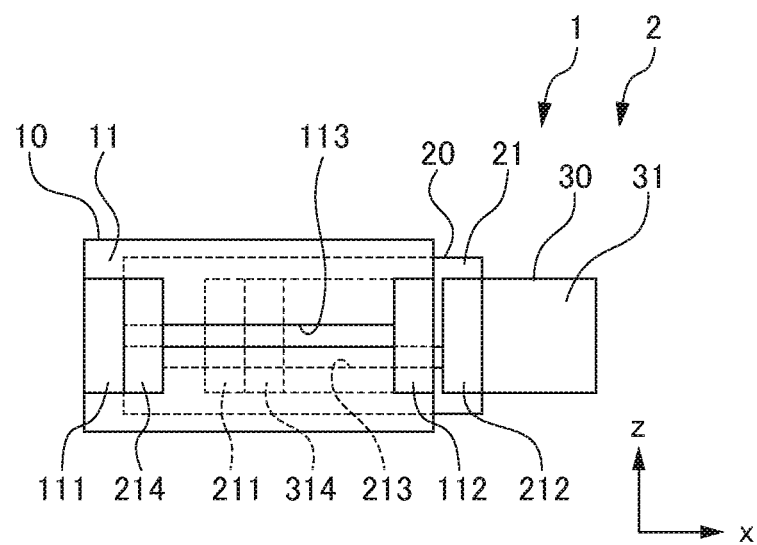
FIG. 1B is a side view showing a state in which the telescopic cover shown in FIG. 1A is contracted.
Figure 2A:
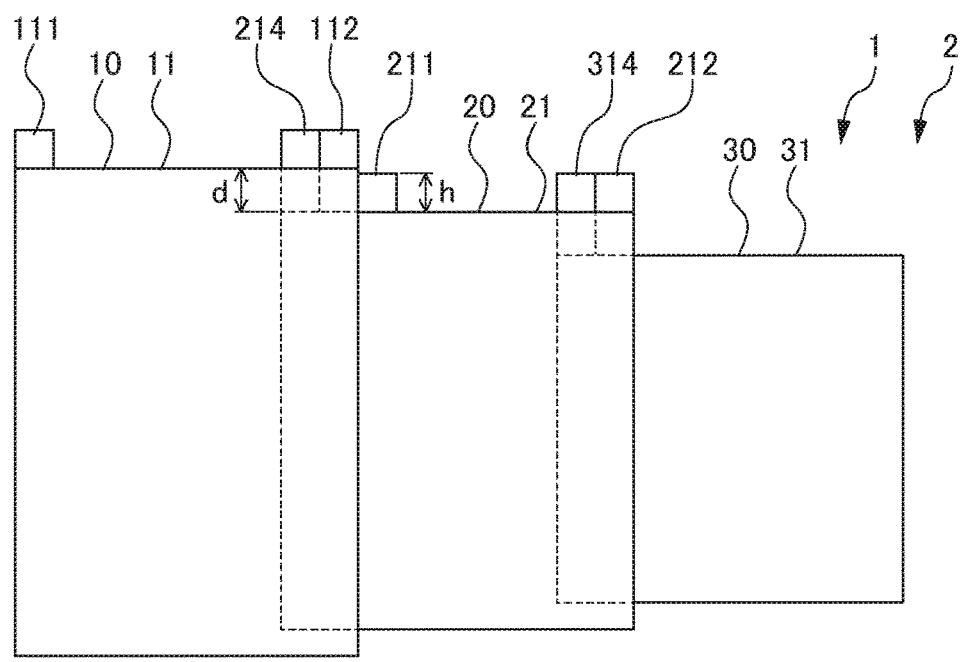
FIG. 2A is a plan view showing a state in which the telescopic cover shown in FIG. 1A is expanded.
Figure 2B:
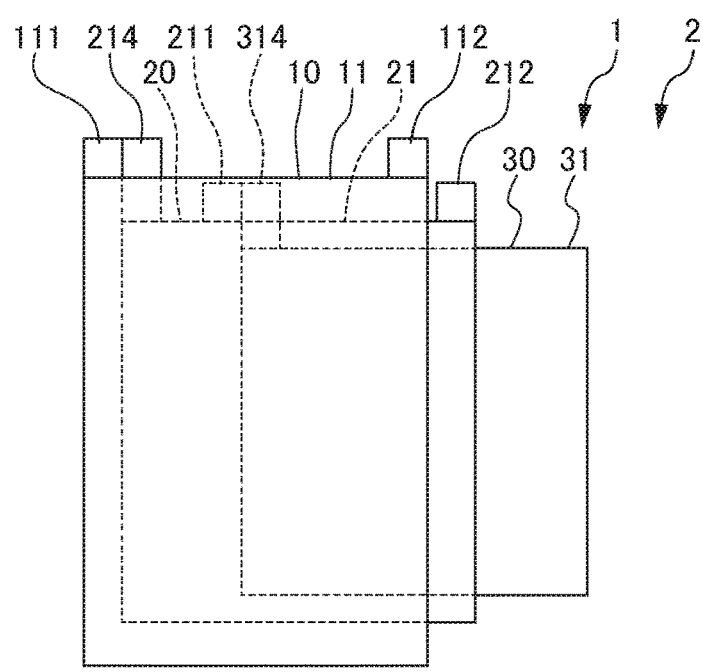
FIG. 2B is a plan view showing a state in which the telescopic cover shown in FIG. 1A is contracted.

An embodiment of the present invention will be described in detail below with reference to FIG. 1A, FIG. 1B, FIG. 2A, and FIG. 2B. FIG. 1A is a side view showing a state in which a telescopic cover 2 of a machine tool 1 according to an embodiment of the present invention is expanded. FIG. 1B is a side view showing a state in which the telescopic cover 2 shown in FIG. 1A is contracted. FIG. 2A is a plan view showing a state in which the telescopic cover 2 shown in FIG. 1A is expanded. FIG. 2B is a plan view showing a state in which the telescopic cover 2 shown in FIG. 1A is contracted.

As shown in FIG. 1, the telescopic cover 2 of the machine tool 1 is formed to be freely expandable and contractible in a predetermined direction X by overlapping a plurality of rectangular tube-shaped cover pieces 10, 20, 30 having different sizes in a nesting structure with each other. The predetermined direction X is a center axis direction of the rectangular tube-shaped cover pieces 10, 20, 30.

This telescopic cover 2 is provided to cover a drive unit of the machine tool 1, and protects the drive unit from chips and cutting fluid. This telescopic cover 2 expands and contracts in the predetermined direction X in accordance with driving of the drive unit.

The first cover piece 10 has an inner dimension larger than an outer dimension of the second cover piece 20, and functions as a receiving side cover piece into which the second cover piece 20 is inserted.

The first cover piece 10 has a pair of receiving side stoppers 111, 112, and a slit 113, as a receiving side cover piece. The pair of receiving side stoppers 111, 112 are cushion rubbers fixed to the first cover piece 10 by a bolt, or the like, so as to project outward in both ends of a side surface 11 along the predetermined direction X in the first cover piece 10. The pair of receiving side stoppers 111, 112 have a jutted shape having an insertion portion inserted into the slit 113, and a jutted portion that juts from a tip end of the insertion portion in an orthogonal direction Z to the slit 113. The slit 113 is formed between the pair of receiving side stoppers 111, 112 along the predetermined direction X, and extends through the inside and outside of the first cover piece 10.

The second cover piece 20 has an outer dimension smaller than an inner dimension of the first cover piece 10, functions as a nesting side cover piece inserted into the first cover piece 10, has an inner dimension larger than an outer dimension of the third cover piece 30, and functions as a receiving side cover piece into which the third cover piece 30 is inserted.

This second cover piece 20 includes a nesting side stopper 214 as a nesting side cover piece, and has a pair of receiving side stoppers 211, 212, and a slit 213 as a receiving side cover piece.

The nesting side stopper 214 is a cushion rubber that is fixed to the second cover piece 20 by a bolt, or the like, so as to project outward in a side surface 21 along the predetermined direction X in the second cover piece 20, extends through the slit 113 of the first cover piece 10, and moves between the pair of receiving side stoppers 111, 112 of the first cover piece 10. This nesting side stopper 214 has a jutted shape in the orthogonal direction Z to the slit 113 of the first cover piece 10, in the outside of the side surface 11 of the first cover piece 10. That is, this nesting side stopper 214 has a similar shape to those of the pair of receiving side stoppers 111, 112 described above.

The pair of receiving side stoppers 211, 212 are cushion rubbers fixed to the second cover piece 20 by a bolt, or the like, so as to project outward in both ends of the side surface 21 along the predetermined direction X in the second cover piece 20. The pair of receiving side stoppers 211, 212 have a jutted shape in the orthogonal direction Z to the slit 213. That is, the pair of receiving side stoppers 211, 212 have similar shapes to those of the pair of receiving side stoppers 111, 112 described above.

A projection height h from the side surface 21 of the second cover piece 20 of the receiving side stopper 211 is smaller than a distance d of a clearance formed between the outside (outer surface) of the side surface 21 of the second cover piece 20, and the inside (inner surface) of the side surface 11 of the first cover piece 10 into which the second cover piece 20 is inserted. The slit 213 is formed between the pair of receiving side stoppers 211, 212 along the predetermined direction X, and extends through the inside and outside of the second cover piece 20. It is preferable that this slit 213 is formed in a position not overlapping with the slit 113 of the first cover piece 10 at the time of contraction of the telescopic cover 2, in order to prevent intrusion of chips, dust, cutting fluid, and the like.

The third cover piece 30 has an outer dimension smaller than an inner dimension of the second cover piece 20, and functions as a nesting side cover piece inserted into the second cover piece 20.

This third cover piece 30 includes a nesting side stopper 314 as a nesting side cover piece. The nesting side stopper 314 is a cushion rubber fixed to the third cover piece 30 by a bolt, or the like, so as to project outward in the side surface 31 along the predetermined direction X in the third cover piece 30, extends through the slit 213 of the second cover piece 20, and moves between the pair of receiving side stoppers 211, 212 of the second cover piece 20. This nesting side stopper 214 has a jutted shape in the orthogonal direction Z to the slit 213 of the second cover piece 20, in the outside of the side surface 21 of the second cover piece 20. That is, this nesting side stopper 214 has a similar shape to those of the pair of receiving side stoppers 111, 112 described above.

Next, expansion and contraction of the telescopic cover 2 of the machine tool 1 will be described with reference to FIG. 1A, FIG. 1B, FIG. 2A, and FIG. 2B.

When an expanded state shown in FIG. 1A and FIG. 2A is changed to a contracted state shown in FIG. 1B and FIG. 2B, in the telescopic cover 2 of the machine tool 1, the second cover piece 20 is inserted into the inside of the first cover piece 10, the nesting side stopper 214 of the second cover piece 20 abuts with the receiving side stopper 111 of the first cover piece 10, the third cover piece 30 is inserted into the inside of the second cover piece 20, and the nesting side stopper 314 of the third cover piece 30 abuts with the receiving side stopper 211 of the second cover piece 20.

On the other hand, when the contracted state shown in FIG. 1B and FIG. 2B is changed to the expanded state shown in FIG. 1A and FIG. 2A, in the telescopic cover 2 of the machine tool 1, the second cover piece 20 is drawn from the inside of the first cover piece 10, the nesting side stopper 214 of the second cover piece 20 abuts with the receiving side stopper 112 of the first cover piece 10, the third cover piece 30 is drawn from the inside of the second cover piece 20, and the nesting side stopper 314 of the third cover piece 30 abuts with the receiving side stopper 212 of the second cover piece 20.

As described above, in the telescopic cover 2 of the machine tool 1 according to the present embodiment, the receiving side stoppers 111, 112 are provided in the outside of the side surface 11 of the first cover piece 10, the receiving side stoppers 211, 212 and the nesting side stopper 214 are provided in the outside of the side surface 21 of the second cover piece 20, and the nesting side stopper 314 is provided in the outside of the side surface 31 of the third cover piece 30. Thus, the receiving side stoppers 111, 112, 211, 212, and the nesting side stoppers 214, 314 are easy to be exchanged. More specifically, since these stoppers are provided in the outside of each cover piece by a bolt, or the like, these stoppers are easy to be exchanged by detaching a bolt from the outside.

The embodiment of the present invention is described above. However, the present invention is not limited to the embodiment described above. Effects described in the present embodiment are only a listing of the most preferable effects generated from the present invention, and the effects by the present invention are not limited to those described in the present embodiment.

In the embodiment described above, a case where the present invention is applied to one side surface 11, 21, 31 of each cover piece 10, 20, 30 is described as an example. However, application is not limited thereto. The present invention may be applied to any surface of the other side surface, upper surface, or lower surface, as long as the surface is along the predetermined direction X in each cover piece 10, 20, 30.

In the embodiment described above, a telescopic cover formed of three cover pieces is described. However, the number of cover pieces is not limited. For example, the present invention may be applied also to a telescopic cover including four or more cover pieces.

EXPLANATION OF REFERENCE NUMERALS

1 Machine tool
2 Telescopic cover
10 First cover piece (cover piece, receiving side cover piece)
20 Second cover piece (cover piece, receiving side cover piece, nesting side cover piece)
30 Third cover piece (cover piece, nesting side cover piece)
11, 21, 31 Side surface
111, 112, 211, 212 Receiving side stopper
113, 213 Slit
214, 314 Nesting side stopper
X Predetermined direction
Z Orthogonal direction
h Projection height
d Distance

What is claimed is:

1. A machine tool comprising a telescopic cover formed to be freely expandable and contractible in a predetermined direction by overlapping a plurality of tube-shaped cover pieces having different sizes in a nesting structure with each other, wherein the plurality of cover pieces respectively function as one or both of receiving side cover pieces and nesting side cover pieces that are inserted into the receiving side cover pieces, the cover pieces functioning as the receiving side cover pieces have a pair of receiving side stoppers that project outward in both end sides of a surface along the predetermined direction, and slits formed along the predetermined direction in between the pair of receiving side stoppers, the cover pieces functioning as the nesting side cover pieces have nesting side stoppers that are inserted into the slits by projecting outward in the surface along the predetermined direction, and move between the pair of receiving side stoppers, and one receiving side stopper of the pair of receiving side stoppers which the cover pieces functioning as both the receiving side cover pieces and the nesting side cover pieces have is disposed between the other receiving side stopper and the nesting side stoppers which the cover pieces have.

2. The machine tool telescopic cover according to claim 1, wherein the nesting side stoppers have a jutted shape in an orthogonal direction to the slits in outsides of the receiving side cover pieces.

3. The machine tool telescopic cover according to claim 1, wherein the receiving side stoppers of the cover pieces that function as both of the receiving side cover and the nesting side cover have a projection height from the cover pieces that is lower than a distance of a clearance formed between outer surfaces of the cover pieces and inner surfaces of the nesting side cover pieces into which the cover pieces are inserted.

4. The machine tool telescopic cover according to claim 2, wherein the receiving side stoppers of the cover pieces that function as both of the receiving side cover and the nesting side cover have a projection height from the cover pieces that is lower than a distance of a clearance formed between outer surfaces of the cover pieces and inner surfaces of the nesting side cover pieces into which the cover pieces are inserted.

* * * * *